United States Patent
Bauernfeind (10) Patent No.: US 11,155,066 B2
(45) Date of Patent: Oct. 26, 2021

(54) FUNCTIONALIZED CORRUGATED CARDBOARD

(71) Applicant: ROBA GROUP AG, Tägerwilen (CH)

(72) Inventor: Roman Bauernfeind, Lipperswil (CH)

(73) Assignee: ROBA GROUP AG, Tägerwilen (CH)

(*) Notice: Subject to any disclaimer, the term of this patent is extended or adjusted under 35 U.S.C. 154(b) by 0 days.

(21) Appl. No.: 15/263,780

(22) Filed: Sep. 13, 2016

(65) Prior Publication Data

US 2017/0001422 A1    Jan. 5, 2017

Related U.S. Application Data

(63) Continuation of application No. PCT/EP2015/000583, filed on Mar. 17, 2015.

(30) Foreign Application Priority Data

Mar. 19, 2014  (DE) .................... 10 2014 003 886.6

(51) Int. Cl.
  *B32B 3/28* (2006.01)
  *B32B 7/04* (2019.01)
  *B32B 7/12* (2006.01)
  *B32B 27/08* (2006.01)
  *B32B 27/10* (2006.01)
  *B65D 65/40* (2006.01)
  *B32B 29/08* (2006.01)
  *B32B 7/05* (2019.01)
  *B31F 1/28* (2006.01)

(52) U.S. Cl.
  CPC ............ *B32B 29/08* (2013.01); *B31F 1/2813* (2013.01); *B32B 7/05* (2019.01); *B32B 7/12* (2013.01); *B32B 27/10* (2013.01); *B65D 65/403* (2013.01); *B32B 2255/10* (2013.01); *B32B 2307/7244* (2013.01); *B32B 2307/7246* (2013.01); *B32B 2307/7248* (2013.01); *B32B 2307/7265* (2013.01); *B32B 2307/748* (2013.01); *B32B 2439/62* (2013.01)

(58) Field of Classification Search
  CPC ........... B32B 29/08; B32B 7/045; B32B 7/12; B32B 27/10; B32B 2307/7246; B32B 2307/7265; B32B 2439/62; B32B 3/28; B32B 7/05; B65D 65/403; Y10T 428/24727; Y10T 428/24694
  USPC ................................... 428/184, 186
  See application file for complete search history.

(56) References Cited

U.S. PATENT DOCUMENTS 3,346,105 A  10/1967 Nye et al.
4,286,006 A   8/1981 Boelter
(Continued)

FOREIGN PATENT DOCUMENTS

DE  10 2009 045 157 A1  4/2011
GB       1 177 213 A    1/1970
(Continued)

OTHER PUBLICATIONS

International Search Report dated Jun. 29, 2015, dated Jul. 8, 2015.
(Continued)

*Primary Examiner* — Joanna Pleszczynska
(74) *Attorney, Agent, or Firm* — Norris McLaughlin, P.A.

(57) ABSTRACT

Functionalized corrugated cardboard, at least one paper web of which is replaced by a functionalized, multi-layer plastic film.

19 Claims, 1 Drawing Sheet

(56) References Cited

U.S. PATENT DOCUMENTS

| | | | |
|---|---|---|---|
| 4,940,612 A | | 7/1990 | Gibbons et al. |
| 5,256,467 A | | 10/1993 | Kato |
| 5,575,418 A | | 11/1996 | Wu et al. |
| 5,848,748 A | | 12/1998 | Bouraoui et al. |
| 6,083,580 A | * | 7/2000 | Finestone ............ B31F 1/2813 428/34.2 |
| 6,184,510 B1 | | 2/2001 | Zucker |
| 7,378,481 B1 | | 5/2008 | Gong et al. |
| 2004/0185230 A1 | * | 9/2004 | Rehkugler ............... B32B 7/12 428/182 |
| 2010/0051674 A1 | * | 3/2010 | Labbe .................... B32B 29/08 229/5.5 |
| 2016/0144994 A1 | * | 5/2016 | Flaming ............... B65D 5/0015 206/509 |

FOREIGN PATENT DOCUMENTS

| | | |
|---|---|---|
| GB | 2 096 052 A | 10/1982 |
| JP | S57-36647 A | 2/1982 |
| JP | 64-039938 A | 2/1989 |
| JP | 02-160551 A | 6/1990 |
| JP | 02-235623 A | 9/1990 |
| JP | 07-081005 A | 3/1995 |
| JP | 2003-531752 A | 10/2003 |
| JP | 2010-518235 A | 5/2010 |
| JP | 2012-30569 A | 2/2012 |
| WO | 2013/141769 A1 | 9/2013 |

OTHER PUBLICATIONS

English Translation of International Search Report dated Jun. 29, 2015, dated Jul. 8, 2015.
German Search Report dated Nov. 20, 2014.
Kunststoffhandbuch Band 3/1—technische Thermoplaste: "Polycarbonate, Polyacetale, Polyester, Celluloseester" [Plastics handbook, vol. 3/1—Engineering thermoplastics: polycarbonates, polyacetals, polyesters, cellulose esters]; Carl Hanser Verlag, 1992 (p. 15 of the Specification).
Kunststoff-Handbuch vol. VI, Polyamide, Carl Hanser Verlag Munich, 1966 (cited on p. 17 of the specification).
Melvin I. Kohan, "Introduction and Commericial Nyoln Plastics and Their Applications", Hanbook, Carl-Hanser Verlag and Chapter 13, pp. 490-599, 1995.

* cited by examiner

FUNCTIONALIZED CORRUGATED CARDBOARD

This application is a Continuation of International Patent Application No. PCT/EP2015/000583, filed Mar. 17, 2015, which claims foreign priority benefit under 35 U.S.C.§ 119 of German Patent Application 10 2014 003 886.6 filed Mar. 19, 2014, the contents of all of which are incorporated herein by reference.

BACKGROUND OF THE INVENTION

The present invention relates to a functionalized corrugated cardboard of which at least one facing sheet of paper of the corrugated cardboard has been substituted by a functionalized, multilayer plastics film.

Corrugated cardboard is usually composed of a plurality of paper sheets, with at least one fluted sheet being arranged between two facing sheets. Although a corrugated cardboard has low weight, it has high stability, and is therefore in particular used as packaging material.

Packagings made of corrugated cardboard moreover provide very good insulation, resulting from the structure of the corrugated cardboard, since corrugated cardboard packagings provide a comparatively high level of insulation against low as well as high temperatures. It is thus possible to protect the packaged goods better in particular with regard to their freshness and shelf life.

The use of corrugated cardboard is disadvantageous in that, inter alia, corrugated cardboard has to be protected against moisture, because otherwise it can soften and lose its mechanical strength. In particular during transport, or storage of packaged products, it is often inevitable that the packaging comes into contact with moisture. Foods such as fresh fruit can moreover let free moisture to the corrugated cardboard packaging, which can cause softening of the latter.

Therefore, the prior art has already disclosed coated corrugated cardboard with a coating made of polymers, preferably with a barrier coating, provided to one or both of the facing sheets of paper. This coated cardboard can, depending on the kind of polymer coating, exhibit a barrier against moisture, gases, oils, or fats. However, this can cause higher costs depending on the production process, because the polymer coating has to be applied in an additional process step to one or more of the facing sheets of paper.

Moreover, it is also known that packagings which are made of corrugated cardboard and comprise a tray with a plastics film inlay optionally with barrier effect, can cause higher production costs.

Another disadvantage of the known coated or uncoated corrugated cardboard having a single fluted sheet is that it cannot be rolled, and therefore has to be transported and processed as stacking sheets. Stacking sheets of corrugated cardboard have disadvantages in continuous industrial processes, whereby continuous sheets are used. Therefore, the processing of stacking sheets can also increase the amount of rejected product.

It was therefore an object of the present invention to provide a functionalized corrugated cardboard which does not have the disadvantages described before.

SUMMARY OF THE INVENTION

This object is solved by the provision of a functionalized corrugated cardboard of which at least one of the facing paper sheets of the corrugated cardboard is replaced by a functionalized, multilayer, preferably flexible plastics film.

The inventive functionalized corrugated cardboard does not have any channels or openings through its partial or its total cross section which in particular applies to packagings made of the functionalized corrugated cardboard.

An advantage of the inventive functionalized corrugated cardboard is its lower weight in comparison to that of a known coated corrugated cardboard, because according to the invention one or more coated facing paper sheets of the corrugated cardboard are replaced by a functionalized, multilayer plastics film. Surprisingly, this does not effect the mechanical properties of such corrugated cardboard, for example the ultimate tensile strength and the rollability of functionalized corrugated cardboard having a single fluted sheet, which are merely not impaired, but instead are actually improved advantageously.

Accordingly, the inventive functionalized corrugated cardboard having a single fluted sheet can be rolled and can be stored and transported as rolled product, and can be processed as rolled product according to known continuous processes.

DETAILED DESCRIPTION

The inventive functionalized corrugated cardboard differs from the known corrugated cardboard mentioned before which comprise a plastics-coated paper sheet in that during disposal of the inventive sheet it is readily possible to separate the functionalized multilayer plastics film, as one sheet from the remainder of the inventive corrugated cardboard, which facilitates a separate disposal and permits a separate recycling of the functionalized multilayer plastics film and, respectively, of the remainder of the inventive corrugated cardboard.

As already described before, a corrugated cardboard is usually composed of a plurality of paper sheets. When a fluted sheet is arranged between two facing sheets, this type of corrugated cardboard is also called an enclosed corrugated cardboard having a single fluted sheet. If there is only one facing sheet bonded to the fluted sheet it is called an open corrugated cardboard having a single fluted sheet. The meaning of an inventive "enclosed corrugated cardboard" is therefore that the functionalized corrugated cardboard has two facing sheets, and accordingly the fluted sheet or fluted sheets of the functionalized corrugated cardboard are arranged between the facing sheets internally. The meaning of an inventive "open corrugated cardboard" is that the functionalized corrugated cardboard has only one facing sheet, and accordingly the fluted sheet, or of at least one of the fluted sheets of the functionalized corrugated cardboard is external and thus without any covering of a facing sheet.

In a preferred embodiment, the functionalized corrugated cardboard is enclosed. In another preferred embodiment, the functionalized corrugated cardboard is open.

In so far as the functionalized corrugated cardboard has a plurality of fluted sheets, it is preferable that there are up to three fluted sheets respectively separated from one another by an intermediate sheet in such a way that, by way of example, a corrugated cardboard having three fluted sheets is composed of six sheets (open corrugated cardboard) or of seven sheets (closed corrugated cardboard). There is an adhesive bonding between the respective individual sheets of the corrugated cardboard and of the fluted sheets arranged between.

In a preferred embodiment, the inventive functionalized corrugated cardboard with a single fluted sheet, preferably being enclosed and having a single fluted sheet, or being open and having a single fluted sheet. In another preferred embodiment, the inventive functionalized corrugated cardboard has a plurality of fluted sheets, preferably at least two fluted sheets.

It is preferable according to the invention that at least one facing sheet and/or at least one intermediate sheet, if present, of the inventive functionalized corrugated cardboard is composed of a multilayer plastics film.

In a preferred embodiment, only one of the two facing sheets of the inventive corrugated cardboard is composed of a multilayer plastics film, which is arranged toward the packaged contents in case the package is manufactured of the functionalized corrugated cardboard.

An open, functionalized corrugated cardboard with a facing sheet made of a multilayer plastics film can advantageously be rolled particularly easily, and either the fluted sheet or the multilayer plastics film as one facing sheet forms the external side of the rolled corrugate cardboard. At the same time, this open, functionalized corrugated cardboard has high flexural stiffness in the direction of the flutes' arrangement of the fluted sheet.

In another preferred embodiment, both facing sheets of the functionalized corrugated cardboard can be composed of a multilayer, functionalized plastics film. In another preferred embodiment, only one intermediate sheet, a plurality of intermediate sheets, or all intermediate sheets, if present, and optionally one facing sheet, or optionally both facing sheets is/are composed of a multilayer, functionalized plastics film.

The properties of the functionalized corrugated cardboard can be influenced not only by the functionalized, multilayer plastics film used according to the invention but also by the selection of the type of paper used, by the weight per unit area of the paper of the paper sheets, by the nature of the corrugation of the corrugated sheet, or by the number of fluted sheets, and can thus be adjusted to be appropriate for different intended uses.

The facing sheets, the corrugated fluted sheets, and/or the intermediate sheets optionally present can be composed of the same, or of different, types of paper. It is preferable according to the invention that they are composed of different types of paper.

The weight per unit area of the paper sheets present in the functionalized corrugated cardboard of the invention is preferably from 35 to 350 g/m², more preferably from 65 to 135 g/m², still more preferably from 75 to 125 g/m². The paper sheets can optionally have been printed in order to provide decoration or information.

For protection against environmental effects, in particular from impairment caused by moisture, oils, and fats, the paper sheets which form the facing sheet or the facing sheets, and/or which preferably in the case of open corrugated cardboard form the exterior fluted sheet, can be coated with a lacquer layer for protection over the optionally present print. Suitable lacquers and methods for applying the lacquers are known to the person skilled in the art. Preference is given to aqueous dispersion lacquers. Alternatively, a thin layer based on paraffins or on high-melting plastics can be coated on the paper sheets. These coatings or lacquers are not multilayer, functionalized plastics films, but instead have only one layer.

It is known that corrugated cardboard is classified according to the flute's size from a corrugated cardboard with very fine flutes (F and G) to one with a coarse flute (A).

When the functionalized corrugated cardboard comprises a plurality of fluted sheets, i.e. by way of example has two fluted sheets or has three fluted sheets, the individual fluted sheets can have different flute profiles.

A functionalized corrugated cardboard having a plurality of fluted sheets can have only one, or a plurality of, flute profile(s) selected from the group comprising G, N, F, E, B, C, and combinations of at least two flute profiles, for example FE, EE, and EB.

Preferably according to the invention the functionalized corrugated cardboard has very fine flutes (F) or (G) or microflute (E), or a combination of these flute profiles in the case of a corrugated cardboard having a plurality of flutes.

The inventive functionalized corrugated cardboard also has been printed for optional provision of product information and consumer information, or for decoration. A print can have been applied on one or both facing sheets and/or on the fluted sheets of the functionalized corrugated cardboard.

When the inventive functionalized corrugated cardboard has more than merely one facing sheet and, respectively, intermediate sheets made of a multilayer plastics film, these sheets of the inventive functionalized corrugated cardboard can respectively be composed of the same multilayer, functionalized, preferably flexible plastics film.

It is preferable according to the invention that at least one facing sheet and one intermediate sheet of the inventive functionalized corrugated cardboard are composed of different multilayer, functionalized plastics films.

In a preferred embodiment, two facing sheets and an optionally present intermediate sheet can respectively be composed of a different multilayer, functionalized, preferably flexible plastics film.

In so far as at least one facing sheet and one intermediate sheet of the inventive functionalized corrugated cardboard are composed of different multilayer, functionalized plastic films, it is preferable according to the invention that the plastics films differ in structure and/or in the composition of, and/or in the thickness of, the layers, or in functionality.

It is preferable that the functionalized, multilayer plastics film used has at least one barrier layer against gases, against moisture, against migration of low-molecular-weight fractions, and/or against impairment of the taste or the odor, and/or against oils and fats, and/or against liquids, in particular aqueous liquids.

According to the invention, it is therefore preferably possible that the functionalized corrugated cardboard comprises at least one facing sheet made of a functionalized plastics film which has a barrier layer against moisture. In another preferred embodiment, one facing sheet can have a barrier layer against moisture, and/or the other facing sheet can have a barrier layer against gases.

When the functionalized corrugated cardboard has a plurality of fluted sheets, preferably two fluted sheets, it is possible that at least one intermediate sheet and at least one facing sheet are composed respectively of a multilayer, functionalized plastics film, where at least one of the sheets has been replaced by a functionalized plastics film with a barrier against moisture, and at least one other sheet has been replaced by a functionalized plastics film with a barrier against gases, against migration of low-molecular-weight fractions, and/or against impairment of taste or of odor, and/or against oils and fats, and/or against liquids.

In another preferred embodiment, the functionalized, multilayer plastics film can have, as facing sheet an absorption layer for liquids, and/or a release layer, and/or a printed layer with information and/or identification, and/or can have a decorative layer, and/or a layer for improving the mechanical properties of the corrugated cardboard.

The functionalized, multilayer, preferably flexible plastics film of which one facing sheet, or both facing sheets, of the inventive corrugated cardboard is/are respectively composed, can preferably have a release layer, and/or a printed layer with information and/or identification, and/or can have a decorative layer, and/or a layer for improving the mechanical properties of the corrugated cardboard.

A functionalized, multilayer plastics film of which a facing sheet or at least one intermediate sheet is composed can moreover comprise an absorption layer for liquids, and/or a layer for improving the mechanical properties of the corrugated cardboard.

In an inventively preferred embodiment, the functionalized corrugated cardboard can have release properties without any release layer on the functionalized, multilayer plastics film, used as facing sheet, when the functionalized, multilayer plastics film has sufficient flexibility to adopt the fluted structure of the fluted sheet. Accordingly, the surface of the functionalized corrugated cardboard adjusted to said structure can have release properties.

Preferably, the functionalized, multilayer plastics film used has no foamed layer.

The inventive functionalized corrugated cardboard can be heat-resistant and in particular microwave-resistant, in so far as the used multilayer, functionalized plastics film has sufficient resistance to high heat. Therefore, the melting point of the functionalized, multilayer plastics film should preferably be above 150° C., more preferably above 160° C.

Specifically, the functionalized, multilayer plastics film used can be composed of preferably at least two, and up to eleven layers. The inventively used functionalized, multilayer plastics film can be composed preferably of at least two, at least three, or at least five layers. The functionalized multilayer plastics film can particularly preferably be composed of 3 to 10 layers.

The functionalized, multilayer plastics film inventively used can preferably comprise a layer sequence comprising at least the following layers made of thermoplastic polymers:
  (a) a layer (a) as surface layer which is optionally sealable or has a release coating,
  optionally (b) an adhesion-promoter layer (b), (c) a functional layer (c), preferably barrier layer,
  optionally (d) an adhesion-promoter layer (d), (e) an optionally sealable layer (e) as surface layer.

When the functionalized, multilayer plastics film is one of the facing sheets of the corrugated cardboard, it is preferable that there is bonding between the external layer (e) of the plastics film and the fluted sheet.

According to another preferred embodiment, the functionalized, multilayer plastics film has the mentioned layer sequence (b)-(d) at least twice, of which the layer (a) and the layer (e) are surface layers. According to this embodiment, the functionalized, multilayer plastics film preferably has at least two functional layers (c) which can have identical or different functionalities.

According to the invention, it is preferred that the multilayer, functionalized plastics film used is stretched longitudinally and/or transversely with a stretching ratio of at least 1:1.5, preferably at least 1:2, particularly preferably from 1:2 to 1:4, thus achieving a plastics film with a particularly high puncture resistance.

Despite this biaxial stretching, the shrinkage of the biaxially oriented, functionalized, multilayer plastics film used inventively is only at most 5%, preferably 3%, because said film was fixed after stretching.

The total thickness of the functionalized plastics film used inventively is preferably from 20 to 350 μm, more preferably from 35 to 250 μm, still more preferably from 40 to 150 μm, most preferably from 80 to 250 μm, and in particular from 90 to 220 μm or from 100 to 200 μm.

The functionalized, multilayer plastics film used inventively preferably comprises a transparent, opaque, or non-transparent, optionally colored layer sequence made of two optionally multiple-ply heat-sealable layers (a) and (e) based on at least one thermoplastic polymer, of at least one preferably transparent layer (c) made of at least one thermoplastic polymer with particular functionality, and optionally made of necessary adhesion-promoter layers (b) and (d) made of a thermoplastic polymer.

As already described, the functionalized, multilayer plastics film used inventively preferably has at least one barrier layer (c), preferably a barrier layer against gases, such as oxygen or water vapor, against moisture, against migration of low-molecular-weight fractions, and/or against impairment of taste or of odor, which layer (c) can be bonding optionally to the adjacent layers respectively by way of an adhesion-promoter layer (b) and, respectively, (d).

It is preferable that the oxygen permeability of the functionalized, multilayer plastics film used inventively is less than 10.00 $cm^3/(m^2 \cdot d \cdot bar)$ at 23° C. and 50% r. h. in accordance with DIN 53380-3. It is preferable that the oxygen permeability of the functionalized, multilayer plastics film is at most 8 $cm^3/(m^2 \cdot d \cdot bar)$, preferably at most 7 or 6 $cm^3/(m^2 \cdot d \cdot bar)$, preferably at most 5, 4, or 3 $cm^3/(m^2 \cdot d \cdot bar)$, still more preferably at most 2, 1, or 0.5 $cm^3/(m^2 \cdot d \cdot bar)$, most preferably at most 0.4, 0.3, or 0.2 $cm^3/(m^2 \cdot d \cdot bar)$, and in particular at most 0.1, 0.09, or 0.08 $cm^3/(m^2 \cdot d \cdot bar)$ (respectively at 23° C. and 50% r. h.).

It is preferable that the water vapor permeability of the functionalized, multilayer plastics film used inventively corresponds at most to the before mentioned oxygen permeability values, whereby the water vapor permeability is determined in accordance with DIN ISO 53 122.

The functionalized, multilayer plastics film used can be each thermoplastic film, in particular each film also used in the food technology sector, with the structure described before.

It is preferably that the functionalized, multilayer plastics film used inventively has, as layer (a) and, respectively, layer (e), which layers are based on the same or different thermoplastic polyolefins, olefin copolymers or a mixture thereof as sealable, preferably heat-sealable layer, and as optionally present adhesion-promoter layer (b) and, respectively, (d), in each case a layer based on modified, thermoplastic polyolefins.

When the surface layers (a) and (e) of the functionalized, multilayer plastics film used inventively are composed of polyolefins, these are layers respectively based, identically or differently, on a thermoplastic polyolefin, olefin copolymer, or mixture of these. Polyolefins and olefin copolymers for the purposes of the present invention are preferably selected from the group comprising polyethylenes (PE)—in particular polyethylenes of low density from 0.86 to 0.93 g/cm$^3$ (LDPE), linear polyethylenes of low density from 0.86 and 0.94 g/cm$^3$ (LLDPE) which comprise besides ehtylene, as comonomer one or more α-olefins having more than 2 carbon atoms, polyethylenes of high density from 0.94 to 0.97 g/cm$^3$ (HDPE), copolymers of ethylene with an α-olefin having 4 carbon atoms (mPE); polypropylenes (PP), polyisobutylenes (PI), polybutylenes (PB), and ethylene-propylene copolymers preferably having from 1 to 10 mol % of ethylene (EPC). The surface layers can also be based on olefin/vinyl carboxylic acid copolymers or on olefin/vinyl ester copolymers, for example ethylene-acrylic acid copolymers (EAA), ethylene-methacrylic acid copolymers (EMAA), ethylene-vinyl acetate copolymers preferably having from 60 to 99 mol % of ethylene (EVA), or on olefin copolymers the molecules of which have been cross-linked by way of ionic bonds, or on a mixture of respectively at least two of the before mentioned polymer types.

In another preferred embodiment, the functionalized plastics film used inventively has a layer (a) with a release coating based on a cured polysiloxane. The polysiloxanes used here and the measures for curing the polysiloxanes are known to the person skilled in the art.

In another preferred embodiment, the layer (e) can be based on at least one polyester or at least one copolyester preferably selected from the group comprising polyalkylene terephthalates such as polyethylene terephthalates (PET, c-PET, a-PET) or PBT and corresponding copolyesters such as CoPET and CoPBT). "PET" means polyethylene terephthalates produced by polycondensation of ethylene glycol and terephthalic acid. It is moreover possible to use amorphous PET (a-PET) and crystalline PET (c-PET). "CoPET" means copolyesters which can also comprise other monomers besides ethylene glycol and terephthalic acid, branched or aromatic diols. "PBT" means polybutylene terephthalates. The intrinsic viscosity of the polyesters or copolyesters used is preferably from 0.1 to 2.0 dl/g, more preferably from 0.3 to 1.5 dl/g, in particular from 0.6 to 1.0 dl/g auf, whereby the methods for determining intrinsic viscosity are known to the person skilled in the art. A detailed description of useful PET, PBT, polycarbonates (PC), and copolycarbonates (CoPC) is disclosed in Kunststoffhandbuch Band 3/1—technische Thermoplaste: Polycarbonate, Polyacetale, Polyester, Celluloseester [Plastics handbook, Volume 3/1—Engineering thermoplastics: polycarbonates, polyacetals, polyesters, cellulose esters]; Carl Hanser Verlag, 1992, the entire appropriate content of which is incorporated by way of reference.

According to a further preferred inventive embodiment it is possible, optionally after a necessary pretreatment, to metalize one of the layers, preferably a layer based on polyester or copolyesters, preferably with aluminum. It is equally possible to bond a metal foil, preferably an aluminum foil, to one of the layers, preferably a layer based on polyester or copolyester.

According to the invention the functionalized, multilayer plastics film has at least one functional layer (c) with a barrier effect. The person skilled in the art is aware of suitable polymers which can be used to create a barrier, in particular against gases, against aroma loss, against migration of low-molecular-weight fractions, and/or against impairment of taste or odor, or against moisture, and/or against oils and fats.

According to the invention it is preferable that the layer (c) used as a barrier against gases or aroma lost, against migration of low-molecular fractions, and/or against impairment of taste or of odor is based on at least one thermoplastic polymer selected from the group comprising ethylene-vinyl alcohol copolymers, polyvinylidene chlorides, vinylidene chloride copolymers, mixtures of at least two of the polymers mentioned, and mixtures of at least one of the polymers mentioned with a ethylene-vinyl acetate copolymer. Preferred vinylidene chloride copolymers have ≥80 mol % of vinylidene chloride.

In another preferred embodiment, the layer (c) composed of a thermoplastic, aliphatic, or (semi)aromatic polyamide or copolyamide, or a mixture of these for creating a barrier against moisture and/or oils.

Polyamides (PA) and copolyamides (CoPA) used for preparing layer (c) are preferably aliphatic or (semi)aromatic polyamides, preferably with melting point in the range from 160 to 240° C., more preferably from 170 to 220° C. Preference is given to aliphatic polyamides, of which at least one polyamide or copolyamide selected from the group comprising PA 4, PA 6, PA 7, PA 8, PA 9, PA 10, PA 11, PA 12, PA 4,2, PA 6,6, PA 6,8, PA 6,9, PA 6,10, PA 6,12, PA 7,7, PA 8,8, PA 9,9, PA 10,9, PA 12,12, PA 6/6,6, PA 6,6/6; or semiaromatic polyamides such as PA6T and PA6I, can be used for the production of the layer (c). PA 6 is particularly preferred. A detailed description of polyamides and copolyamides is disclosed in Kunststoff-Handbuch Band VI, Polyamide [Plastics handbook, Volume VI, Polyamides], Carl Hanser Verlag, Munich, 1966; and Melvin I. Kohan, *Nylon Plastics Handbook*, Carl Hanser Verlag, Munich, 1995, the entire appropriate content of which is incorporated by reference.

In another preferred embodiment, the functional layer (c), useful as absorption layer preferably for liquids, particularly preferably for aqueous liquids, can be composed of a superabsorbent polymer.

Superabsorbent polymers used are preferably polymers of acrylic acid and of at least one of its alkali metal salts.

A facing sheet of the inventive functionalized corrugated cardboard is preferably replaced by the mentioned functionalized, multilayer plastics film.

The inventive functionalized corrugated cardboard comprises neither a plastics film with a foamed layer nor a single-layer, foamed film, nor a foamed inlay.

Preferably the barrier layers (c) mentioned are bonded by means of adhesion-promoter layers (b) and (d) to the adjacent layers of the plastics film used inventively.

Therefore, the used functionalized, multilayer plastics film has preferably one or more adhesion-promoter layers (b) and (d).

The person skilled in the art is aware of suitable thermoplastic polymers which can be used as adhesion-promoter materials. It is preferable that the adhesion-promoter layers (b) and (d) are based, identically or differently, on a preferably modified polyolefin and/or olefin copolymer, preferably selected from the group comprising carboxy- or cyclic-anhydride-groups- modified polyethylenes and polypropylenes, in particular with maleic-acid-anhydride-modified polyethylenes and polypropylenes, and ethylene-vinyl acetate copolymers. Preference is given to maleic-acid-anhydride-modified PE, COOH-modified PE, carboxy-groups-modified copolymers of ethylene-vinyl acetate or of ethylene (meth)acrylate, cyclic-anhydride-modified ethylene-vinyl acetate copolymers, and polymer mixtures comprising at least two of the before mentioned polymers. Particular preference is given to maleic-acid-anhydride-modified copolymers.

According to another preferred embodiment, the multilayer, functionalized plastics film used inventively comprises a layer sequence made of:
(a) as surface layer, an optionally sealable layer, preferably optionally heat-sealable layer (a), composed of at least one thermoplastic olefin homo- or copolymer or mixture of these, optionally with a release coating,
(b) an adhesion-promoter layer (b),
(f) a layer (f) composed of at least one homo- and/or copolyamide,
(c) a functional layer, preferably barrier layer (c),
(f) another layer (f) composed of at least one homo- and/or copolyamide, (d) another adhesion-promoter layer (d), optionally (g) a layer (g) composed of at least one thermoplastic olefin homo- or copolymer, or mixture of these, or of at least one homo- or copolyamide, or mixture of these, and (e) an optionally sealable, preferably optionally heat-sealable, surface layer (e) composed of at least one thermoplastic olefin homo- or copolymer, or mixture of these.

Preferably the barrier layer (c) is adjoined in each case to an intermediate layer (f). These intermediate layers (f) protect the barrier layer (c), when necessary, from the effect of moisture, and from damage during thermoforming.

Preferably the intermediate layers (f) are based on homo- and/or copolyamides as described before.

Preferably the optionally present layer (g) is based on thermoplastic olefin homo- or copolymers, or a mixture of these, or on at least one homo- or copolyamide, or a mixture of these, whereby the corresponding polymers have already been described before in connection with the polymers suitable for producing the layers (a), (c), and (e).

According to a preferred embodiment, the multilayer, functionalized plastics film used inventively can have a layer sequence (b), (f), (c), (f), (d), and optionally (g) twice besides the layer (a) and the layer (e) as surface layers.

According to another preferred embodiment, the functionalized, multilayer plastics film used inventively is sealable and highly transparent, and has a shrinkage of at most<5%, and exhibits a barrier against gases, such as oxygen or water vapor, against moisture, against migration of low-molecular-weight fractions, and/or against impairment of taste or of odor. Accordingly, such film can preferably be used for the functionalization of corrugated cardboard that is used inter alia for food packaging.

The inventive functionalized corrugated cardboard is produced by bonding the functionalized, multilayer plastics film to the fluted sheet. This bonding is preferably achieved via adhesion or heat-sealing of the layer (e) of the plastics film onto the fluted sheet.

For the bonding of the functionalized plastics film to the respective peaks or valleys of the flutes of a fluted sheet via adhesive bonding, an adhesive based on maize starch, on wheat starch, or on potato starch or a combination thereof can preferably be used.

In case the functionalized multilayer plastics film has a sealable layer as surface layer (e) and/or (a), the plastics film can preferably be bonded by means of the layer (e) or (a) to the peaks or valleys of the flutes of the fluted sheet by sealing, preferably with heat.

In a particularly preferred embodiment, the functionalized corrugated cardboard used inventively is open or enclosed; and has a single fluted sheet or two fluted sheets; and has at least one fluted sheet with an N, F, E, B, or C profile, or has at least two fluted sheets with a combination profile such as a FE, EE, or EB profile; and has at least one of the facing sheets made of a functionalized, multilayer plastics film; and has the functionalized, multilayer plastics film with a layer structure made of (a), optionally (b), (c), optionally (d) and (e); and has the functionalized, multilayer plastics film as layer (c) with a barrier against gases, against moisture, against migration of low-molecular-weight fractions, and/or against impairment of taste or of odor, and/or against oils and fats, and/or against liquids; and has the functionalized, multilayer plastics film with thickness from 90 to 220 µm; and comprises the functionalized, multilayer plastics film with layers made of PE, PA, and/or EVOH.

It is particularly preferable according to the invention that the functionalized corrugated cardboard is used as packaging material, inter alia for the production of packaging trays, of closed containers, or of pots.

As far as packaging trays are produced from the inventive functionalized corrugated cardboard, the aperture of the packaging tray can be polygonal, preferably triangular, rectangular, square, or round. The side walls of the packaging tray can usually be formed in a manner that they are to some extent conical toward the bottom, thus improving the stackability of the packaging tray.

The packaging tray is produced by punching a cut-to-size section from the functionalized corrugated cardboard by means of a punch and by folding such section to a tray.

After folding, the folded structure of packaging tray can be fixed by interlocking connections and/or by frictional connections. It is preferably that the packaging tray is produced from a flat cut-to-size section by folding the side walls upward and by adhesive-bonding one to another. It is preferable that the side walls are not arranged vertically, but instead the arrangement is such that the cross section of the packaging tray becomes narrower downward.

In a preferred embodiment, the packaging tray is shaped by folding (erection), which structure is preferably fixed by adhesion of tongues, preferably with a dispersion adhesive. The person skilled in the art is aware of suitable dispersion adhesives for adhesion of tongues.

In case the functionalized corrugated cardboard is an open one, and the facing sheet is composed of a functionalized multilayer film, it is preferable that said facing sheet is arranged toward the internal side of the packaging tray.

When both facing sheets of the functionalized corrugated cardboard are composed of a functionalized multilayer film each of which has a surface layer (a) as heat-sealable layer, arranged opposite to the fluted sheet, the folded structure can preferably be fixed by heat sealing, preferably in the region of the tongues. It is moreover preferable according to this embodiment of the invention to close the open edges between the side walls of the packaging tray by heat sealing. Thereby, the respective heat-sealable surface layers (a) which face toward the internal side of the tray and which are part of the respective adjacent side walls are bonded to one another along their shared internal edges.

The packaging trays preferably thus produced can be sealed by heat-sealing, using a lid which is preferably sealable. Preferably according to the invention the lid is made of a sealable plastics film, or has a sealable layer arranged towards the tray, so that the lid can preferably be bonded to the tray by heat-sealing. According to the design of the tray the sealing with the lid film can be achieved on an optionally present circumferential flange of the tray, facing the layer of the functionalized corrugated cardboard oriented towards the internal side of the tray composed of a functionalized, sealable multilayer plastics film. If the surface layer of the functionalized corrugated cardboard arranged at the external side of the tray is composed of a functionalized multilayer, sealable plastics film, sealing can also be achieved on the external side of the tray.

Preferably the lid is made of a multilayer plastics film which preferably has at least one barrier layer against gases, against moisture, against migration of low-molecular-weight fractions, and/or against impairment of taste or of odor, and/or against oils and fats, and/or against liquids. The structure of this lid film can comprise the layer sequence (a), optionally (b), (c), optionally (d), and (e) described before.

Products can be packed in a packaging tray made of a functionalized corrugated cardboard and of a lid described before in order to improve product quality—for example freshness and color—and to improve shelf life, preferably under a protective gas atmosphere, as long as possible for the packaged product.

In case a one-part, closed container is produced from the inventive functionalized corrugated cardboard, the cut-to-size section also comprising a lid element is punched out of the functionalized corrugated cardboard, preferably by means of a punch, and is erected preferably by folding.

Folding and subsequent fixing is preferably achieved as already disclosed before in connection with production of the packaging tray.

After folding, fixing, and filling, the container comprising already the lid element is closed completely, and the lid element can optionally be bonded tightly to the side walls of the container tray; whereby a tear strip can optionally be used for facilitating the opening of the resultant closed packaging by the consumer.

Such fully closeable cartons are preferably used for the packaging of detergent and of other free-flowing solids.

According to another preferred embodiment, a cup, e.g. for yogurt, can be produced from the functionalized corrugated cardboard. Therefore, it is preferable to punch one or more cut-to-size sections, according to the design, out of the functionalized corrugated cardboard, which are erected, preferably by folding.

The folding and subsequent fixing is preferably carried out as already disclosed before in connection with production of the packaging tray.

The cups preferably have a circumferential flange, and can be sealed with a lid, as already described before in connection with the packaging tray, preferably by heat-sealing.

The packaging produced from the inventive functionalized corrugated cardboard is preferably suitable for products of any type, preferably foods, other consumable items, animal feed, medical products, and detergents, in solid or liquid, preferably solid, form. Particular preference is given to packaging produced from the inventive functionalized corrugated cardboard for raw or cooked food such as fruit and vegetables, meat and fish, meat products such as ham or sausage, ready meals, deep-frozen food, animal feed, dry powders of any type, solid milk products, confectionary such as chocolate products, pasta, medical products, detergents, yogurt, liquids, such as milk, fruit juices, water and wine, and decorative items.

Other preferred packagings made up of an inventive functionalized corrugated cardboard are overwrap packagings for transport and packagings for overseas shipment, in particular as protection against moisture.

The respective individual components or materials, coatings, colors, etc. of the inventive functionalized corrugated cardboard are selected in such a way that the packaging complies with the respective requirements of the contents, e.g. suitability for content with foods in the case of packaging of foods and other consumable items.

A packaging made of the inventive functionalized corrugated cardboard can optionally be sterilizable, pasteurizable, and/or suitable for exposure to microwaves.

BRIEF DESCRIPTION OF THE DRAWINGS

Key for FIGS. 1 to 3
FIG. 1 Facing sheet made of paper
FIG. 2 Fluted sheet made of paper
FIG. 3 Facing sheet made of functionalized, multilayer plastics film
FIG. 4 Intermediate sheet made of functionalized, multilayer plastics film

Figure 1:
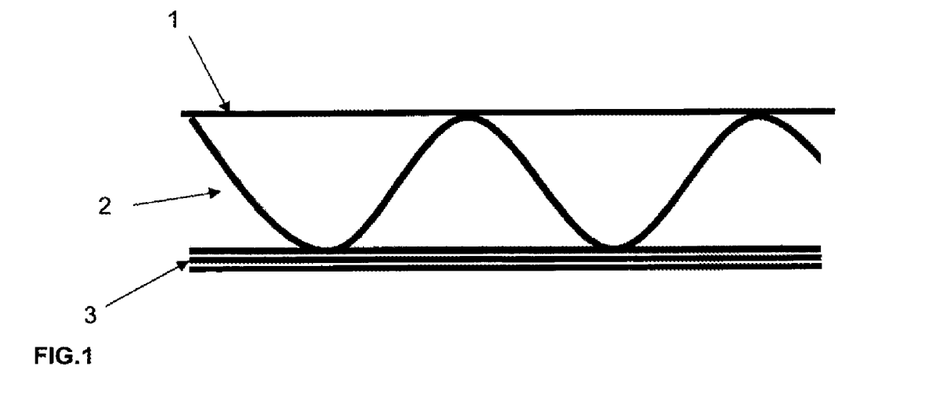
FIG. 1 shows an inventive enclosed corrugated cardboard which has a single fluted sheet and which is composed of the facing sheet 1 made of paper sheet and of the facing sheet 3 made of a functionalized, multilayer plastics film, and of a fluted sheet 2 made of a paper sheet arranged therebetween. The interior surface of the facing sheet 1 adjoins the fluted sheet 2, to which it has been bonded by adhesive bonding in the region of the peaks of the flutes. The layer (a) of the functionalized, multilayer plastics film, as surface layer 3, adjoins the fluted sheet 2, and has been bonded by heat-sealing at this region to the valleys of the fluted sheet 2.
Figure 2:
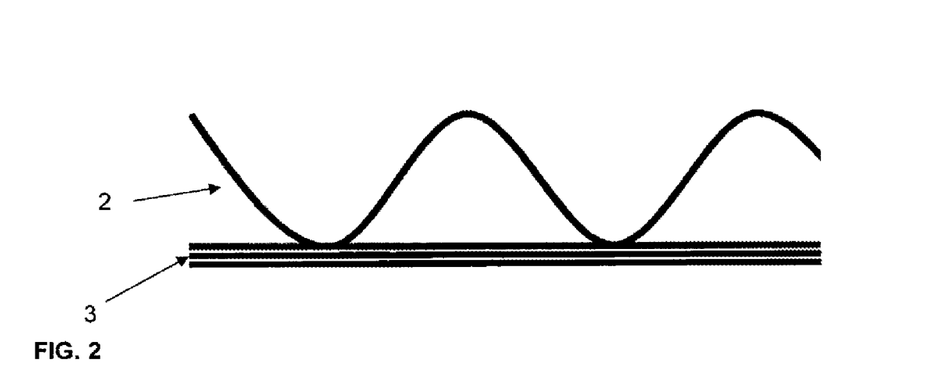

FIG. 2 shows a functionalized, open corrugated cardboard which is composed of the fluted sheet 2 made of a paper sheet, and of a facing sheet 3 adjacent thereto. The sealable layer (a) of the functionalized plastics film, a facing sheet 3, adjoins the fluted sheet 2 made of paper sheet, and has been bonded thereto by heat-sealing of the layer (a).

Figure 3:
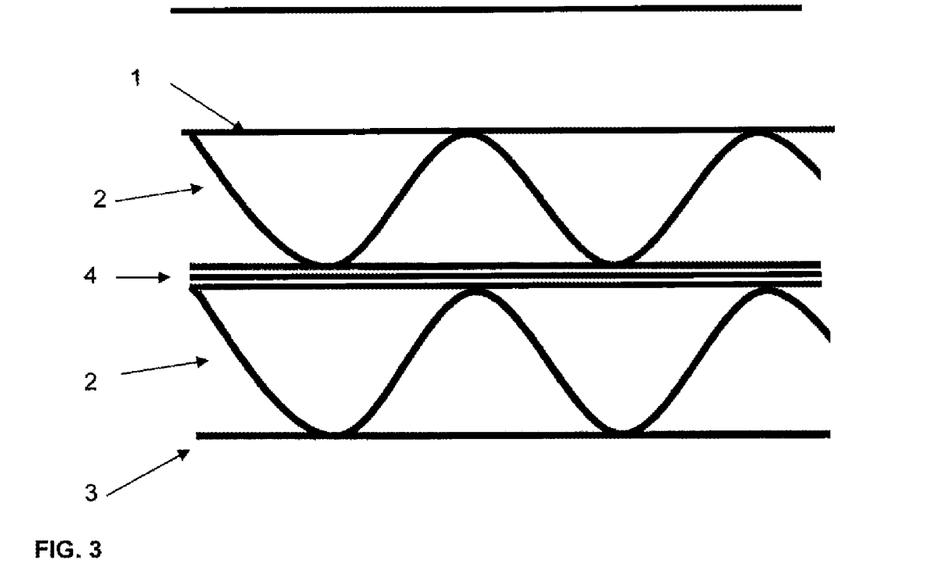

FIG. 3 shows corrugated cardboard which has two flutes and which is composed of two fluted sheets 2, of a facing sheet 1 made of a paper sheet, of a facing sheet 3 made of a functionalized, multilayer plastics film, and of an intermediate sheet 4 made of a functionalized, multilayer plastics film. The fluted sheet 2 adjoins the facing sheet 1 and the intermediate sheet 4, which has been bonded to the intermediate sheet 4 in the region of the valleys of the flutes by way of heat-sealing of the sealable layer (a) of the functionalized, multilayer plastics film. The second surface of the functionalized, multilayer plastics film, as intermediate sheet 4, adjoins the second fluted sheet 2, and has been bonded thereto by heat-sealing in the region of the peaks of the flutes by way of the heat-sealable layer (e) of the functionalized, multilayer plastics film. The interior surface of the facing sheet 3 adjoins the second fluted sheet 2, and has been bonded thereto at the region of the valleys of the flutes by heat-sealing of the layer (a) of the functionalized, multilayer plastics film, as facing sheet 3.

What is claimed is:

1. A functionalized corrugated cardboard comprising:
   a first and second facing sheet;
   a first fluted sheet;
   an intermediate sheet; and
   a second fluted sheet,
   wherein:
   the intermediate sheet is disposed between the first fluted sheet and the second fluted sheet;
   the first fluted sheet is bonded to the intermediate sheet;
   the second fluted sheet is bonded to the intermediate sheet;
   the first facing sheet consists of a first multilayer, functionalized plastic film; and
   the intermediate sheet consists of a second multilayer, functionalized plastic film; and
   the second facing sheet consists of a third multilayer, functionalized plastic film;
   and wherein:
   a structure of the first multilayer, functionalized plastic film and a structure of the second functionalized plastic film differ;
   a composition of the layers of the first multilayer, functionalized plastic film and a composition of the layers of the second multilayer, functionalized plastic film differ;

a thickness of at least one of the layers of the first multilayer, functionalized plastic film and a thickness of at least one of the layers of the second multilayer, functionalized plastic film differ;

a number of layers of the first multilayer, functionalized plastic film and a number of layers forming the second multilayer, functionalized plastic film differ; and/or the functionality of the first multilayer, functionalized plastic film and the functionality of the second multilayer, functionalized plastic film differ;

and wherein the third multilayer, functionalized plastic film is the same or differs from the first multilayer, functionalized plastic film.

2. The functionalized corrugated cardboard as claimed in claim 1, wherein:

the first multilayer, functionalized plastic film comprises at least first one layer functioning as a barrier layer against a first gas, against a first amount of moisture, against a migration of a first low-molecular-weight fraction, against an impairment of a first taste, against an impairment of a first odor, against a first oil, against a first fat, or against a first liquid;

the second multilayer, functionalized plastic film comprises at least one second layer functioning as a barrier layer against a second gas, against a second amount of moisture, against a migration of a second low-molecular-weight fraction, against an impairment of a second taste, against an impairment of a second odor, against a second oil, against a second fat, or against a second liquid.

3. The functionalized corrugated cardboard as claimed in claim 1, wherein the first multilayer, functionalized plastic filmcomprises at least one of an absorption layer for a liquid, a surface layer comprising a release coating, a printed layer with information, a printed layer with an identification, a printed layer with information and an identification, a decorative layer, and a layer for improving a mechanical property of the functionalized corrugated cardboard.

4. The functionalized corrugated cardboard as claimed in claim 1, wherein the first multilayer, functionalized plastic film comprises:

a first surface layer which is optionally sealable or comprises a release coating;

optionally a first adhesion-promoter layer;

a functional layer;

optionally a second adhesion-promoter layer; and a second surface layer comprising an optionally sealable layer;

wherein:

the functional layer is disposed between the first surface layer and the second surface layer;

the first adhesion-promoter layer, when present, is disposed between the first surface layer and the functional layer; and the second adhesion-promoter layer, when present, is disposed between the second surface layer and the functional layer.

5. The functionalized corrugated cardboard as claimed in claim 4, wherein:

the first surface layer is sealable and comprises a polyolefin layer comprising a thermoplastic polyolefin homopolymer, a thermoplastic polyolefin copolymer, or a mixture thereof;

when present, the first adhesion-promoter layer comprises a layer based on a first modified, thermoplastic polyolefin; and when present, the second adhesion-promoter layer comprises a layer based on a second modified, thermoplastic polyolefin.

6. The functionalized corrugated cardboard as claimed in claim 4, wherein the functional layer is based on a thermoplastic polymer comprising an ethylene-vinyl alcohol copolymer, polyvinylidene chloride, a vinylidene chloride copolymer, or a mixture thereof further comprising an ethylene-vinyl acetate copolymer.

7. The functionalized corrugated cardboard as claimed in claim 4, wherein the functional layer is based on at least one thermoplastic aliphatic polyamide, at least one thermoplastic (semi)aromatic polyamide, at least one copolyamide, or a mixture thereof.

8. The functionalized corrugated cardboard as claimed in claim 4, wherein the functional layer is based on a polymer which is superabsorbent.

9. The functionalized corrugated cardboard as claimed in claim 4, wherein:

the first adhesion-promoter is present;

the second adhesion-promoter is present; and the first multilayer, functionalized plastic film further comprises a third adhesion-promoter layer, a fourth adhesion-promoter layer, and an additional functional layer.

10. The functionalized corrugated cardboard as claimed in claim 1, wherein the first multilayer, functionalized plastic film has a total thickness from 35 to 350 µm.

11. The functionalized corrugated cardboard as claimed in claim 1, wherein the functionalized corrugated cardboard further comprises a very fine flute or a microflute.

12. The functionalized corrugated cardboard as claimed in claim 1, wherein the second multilayer, functionalized plastic film comprises:

a first surface layer which is optionally;

a functional layer;

optionally a second adhesion-promoter layer; and a second surface layer comprising an optionally sealable layer;

wherein:

the functional layer is disposed between the first surface layer and the second surface layer;

the first adhesion-promoter layer, when present, is disposed between the first surface layer and the functional layer; and the second adhesion-promoter layer, when present, is disposed between the second surface layer and the functional layer.

13. The functionalized corrugated cardboard as claimed in claim 12, wherein:

the first surface layer is sealable and comprises a polyolefin layer comprising a thermoplastic polyolefin homopolymer, a thermoplastic polyolefin copolymer, an olefin copolymer, or a mixture thereof;

when present, the first adhesion-promoter layer comprises a layer based on a first modified, thermoplastic polyolefin; and when present, the second adhesion-promoter layer comprises a layer based on a second modified, thermoplastic polyolefin.

14. The functionalized corrugated cardboard as claimed in claim 12, wherein the functional layer is based on a thermoplastic polymer comprising an ethylene-vinyl alcohol copolymer, polyvinylidene chloride, a vinylidene chloride copolymer, or a mixture thereof further comprising an ethylene-vinyl acetate copolymer.

15. The functionalized corrugated cardboard as claimed in claim 12, wherein the functional layer is based on at least one thermoplastic aliphatic polyamide, at least one thermoplastic (semi)aromatic polyamide, at least one copolyamide, or a mixture thereof.

16. The functionalized corrugated cardboard as claimed in claim 12, wherein the functional layer is based on a polymer which is superabsorbent.

17. The functionalized corrugated cardboard as claimed in claim 12, wherein:
the first adhesion-promoter is present;
the second adhesion-promoter is present; and
the first multilayer, functionalized plastic film further comprises a third adhesion-promoter layer, a fourth adhesion-promoter layer, and an additional functional layer.

18. The functionalized corrugated cardboard as claimed in claim 1, wherein the second multilayer, functionalized plastic film has a total thickness from 35 to 350 μm.

19. The functionalized corrugated cardboard as claimed in claim 1, wherein:
a structure of the first multilayer, functionalized plastic film and a structure of the third functionalized plastic film differ;
a composition of the layers of the first multilayer, functionalized plastic film and a composition of the layers of the third multilayer, functionalized plastic film differ;
a thickness of at least one of the layers of the first multilayer, functionalized plastic film and a thickness of an at least one of the layers of the third multilayer, functionalized plastic film differ;
a number of layers of the first multilayer, functionalized plastic film and a number of layers forming the third multilayer, functionalized plastic film differ; and/or
the functionality of the first multilayer, functionalized plastic film and the functionality of the third multilayer, functionalized plastic film differ.

* * * * *